(12) United States Patent
Tamborski et al.

(10) Patent No.: US 10,761,753 B2
(45) Date of Patent: Sep. 1, 2020

(54) SITE-BASED COORDINATION OF DISTRIBUTED STORAGE NETWORK MEMORY

(71) Applicant: International Business Machines Corporation, Armonk, NY (US)

(72) Inventors: Patrick A. Tamborski, Chicago, IL (US); Bart R. Cilfone, Marina del Ray, CA (US); Alan M. Frazier, Palatine, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 106 days.

(21) Appl. No.: 16/033,439

(22) Filed: Jul. 12, 2018

(65) Prior Publication Data

US 2020/0019328 A1 Jan. 16, 2020

(51) Int. Cl.
*G06F 15/177* (2006.01)
*G06F 3/06* (2006.01)
*G06F 11/10* (2006.01)

(52) U.S. Cl.
CPC .......... *G06F 3/0632* (2013.01); *G06F 3/0604* (2013.01); *G06F 3/067* (2013.01); *G06F 3/0619* (2013.01); *G06F 3/0653* (2013.01); *G06F 11/1076* (2013.01)

(58) Field of Classification Search
CPC ............... H04L 29/06; H04L 29/08072; H04L 29/08981; G06F 3/0632; G06F 3/0604; G06F 3/0619; G06F 3/0653; G06F 3/067
See application file for complete search history.

(56) References Cited

U.S. PATENT DOCUMENTS 7,194,491 B2 * 3/2007 Inagaki ............... G06F 11/1464
707/999.2
7,302,465 B2 * 11/2007 Ayres ...................... H04L 29/06
709/203

(Continued)

OTHER PUBLICATIONS

IBM Knowledge Center, "Dispersed storage defined." [Accessed Jan. 23, 2018] https://www.ibm.com/support/knowledgecenter/STXNRM_3.10.2/coss.doc/c_coss_dispersed_infodispersal_defined.html.

(Continued)

*Primary Examiner* — Razu A Miah
(74) *Attorney, Agent, or Firm* — James Nock; Andrew D. Wright; Roberts Calderon Safran & Cole, P.C.

(57) ABSTRACT

A method for a dispersed storage network (DSN), the method begins by creating a plurality of DSN storage sites including a subset of a plurality of DSN storage units, retrieving current site configuration for each of the plurality of DSN storage units and electing a local master management unit for each of the DSN storage sites. The method continues by maintaining aggregated views of each the DSN storage sites via each of the local master management units, collecting, via the local master management unit, local state information from the subset of a plurality of DSN storage units, calculating, via the local master management unit, tabulated state information and distributing the tabulated state information across all storage units within the DSN storage site, thus reaching consistency. The method includes updating the DSN management unit with the tabulated state information.

20 Claims, 6 Drawing Sheets

(56) References Cited

U.S. PATENT DOCUMENTS

| | | | |
|---|---|---|---|
| 7,693,962 B2* | 4/2010 | Serlet | H04L 29/06 709/219 |
| 8,135,813 B2* | 3/2012 | Gonzalez | G06F 8/61 709/222 |
| 8,145,729 B2* | 3/2012 | Chung | H04L 29/06 709/219 |
| 8,583,958 B2 | 11/2013 | Surkov | |
| 8,655,696 B2* | 2/2014 | Akatsu | G06Q 10/06 705/7.11 |
| 9,015,238 B1* | 4/2015 | Anton | G06F 16/256 709/203 |
| 9,235,482 B2* | 1/2016 | Hildebrand | G06F 11/203 |
| 9,344,500 B2* | 5/2016 | Resch | G06F 11/1076 |
| 9,369,526 B2* | 6/2016 | Resch | H04L 67/1097 |
| 9,442,800 B2* | 9/2016 | Baptist | G06F 11/1076 |
| 9,716,624 B2* | 7/2017 | Zeyliger | G06F 9/44505 |
| 9,760,286 B2* | 9/2017 | Abhijeet | G06F 11/1076 |
| 10,365,968 B2 | 7/2019 | Motwani | |
| 2006/0015649 A1* | 1/2006 | Zutaut | H04L 67/303 709/246 |
| 2010/0268820 A1* | 10/2010 | Shi | H04L 67/1065 709/224 |
| 2011/0289383 A1 | 11/2011 | Dhuse et al. | |
| 2013/0138862 A1* | 5/2013 | Motwani | H04L 9/0825 711/5 |
| 2013/0173987 A1* | 7/2013 | Grube | G06F 11/10 714/755 |
| 2013/0201827 A1* | 8/2013 | Zhang | H04L 45/24 370/230 |
| 2013/0290399 A1* | 10/2013 | Gordon | H04L 67/1097 709/201 |
| 2014/0074978 A1* | 3/2014 | Yu | H04L 67/02 709/217 |
| 2014/0115089 A1* | 4/2014 | Maybee | G06F 16/24544 709/213 |
| 2014/0208396 A1* | 7/2014 | Leggette | G06F 11/2094 726/4 |
| 2014/0237070 A1* | 8/2014 | Choi | H04L 67/1097 709/216 |
| 2014/0289555 A1* | 9/2014 | Grube | G06F 13/1668 714/6.22 |
| 2014/0351632 A1* | 11/2014 | Grube | G06F 11/1076 714/6.24 |
| 2014/0372607 A1* | 12/2014 | Gladwin | H04L 43/0876 709/224 |
| 2015/0039735 A1* | 2/2015 | Zeyliger | G06F 9/44505 709/221 |
| 2016/0210194 A1* | 7/2016 | Kumarasamy | G06F 3/064 |
| 2017/0070598 A1 | 3/2017 | Bute et al. | |
| 2017/0090824 A1 | 3/2017 | Tamborski | |
| 2017/0093978 A1 | 3/2017 | Cilfone et al. | |
| 2017/0094013 A1* | 3/2017 | Chong | G06F 3/0619 |
| 2018/0004449 A1* | 1/2018 | Cilfone | G06F 11/3082 |
| 2018/0203641 A1* | 7/2018 | Petrocelli | G06F 3/067 |

OTHER PUBLICATIONS

IBM Technical Whitepaper, "The definitive guide to IBM Cloud Object Storage dispersed storage," Jul. 2016, TSW03335-USEN-02. http://www.proventx.ch/files/content/Bilder/Systems/IBM%20Technical%20White%20Paper.pdf.

K. Kapusta, "Data protection by means of fragmentation in various different distributed storage systems—a survey." (Submitted on Jun. 16, 2017) https://arxiv.org/abs/1706.05960.

R. Harris, "Cleversafe's dispersed storage network." Mar. 3, 2008 [Accessed Jan. 23, 2018] https://storagemojo.com/2008/03/03/cleversafes-dispersed-storage-network/.

T. Pearson, IBM Master Inventor and Senior Engineer, "IBM Cloud Object Storage System (powered by Cleversafe) and its Applications." Published on Sep. 23, 2016. Presented at IBM Edge2016 conference. ZSP03490-USEN-0, https://www.slideshare.net/az990tony/ibm-cloud-object-storage-system-powered-by-cleversafe-and-its-applications.

Anonymous, "Dispersed Storage Network Architecture", https://pdfs.semanticscholar.org/677f/1c5c4dd97e69df73b42b396e63a5244ef1bf.pdf, CleverSafe, 2010, 30 pages.

* cited by examiner

SITE-BASED COORDINATION OF DISTRIBUTED STORAGE NETWORK MEMORY

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

DETAILED DESCRIPTION OF THE INVENTION

Figure 1:
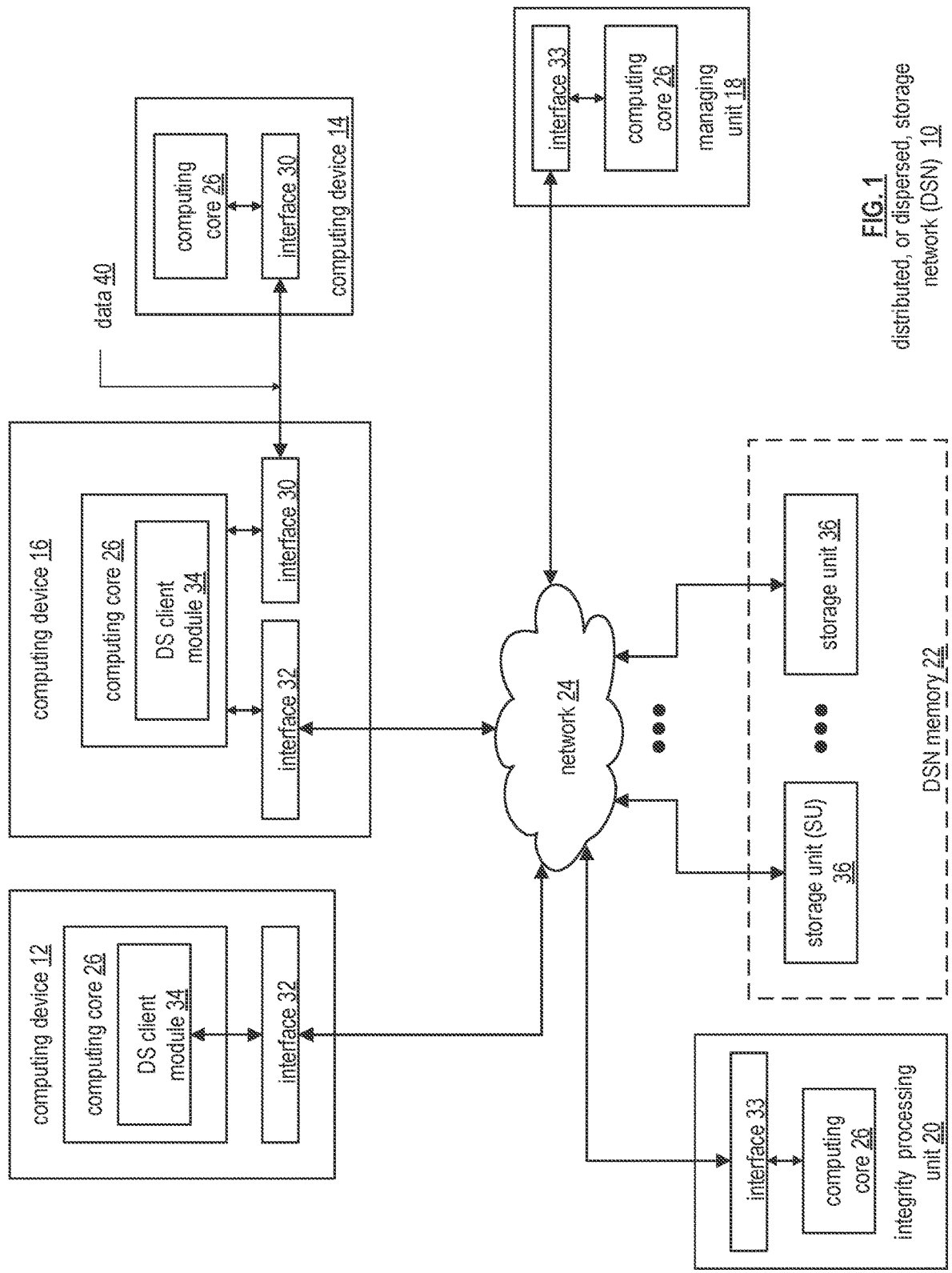
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
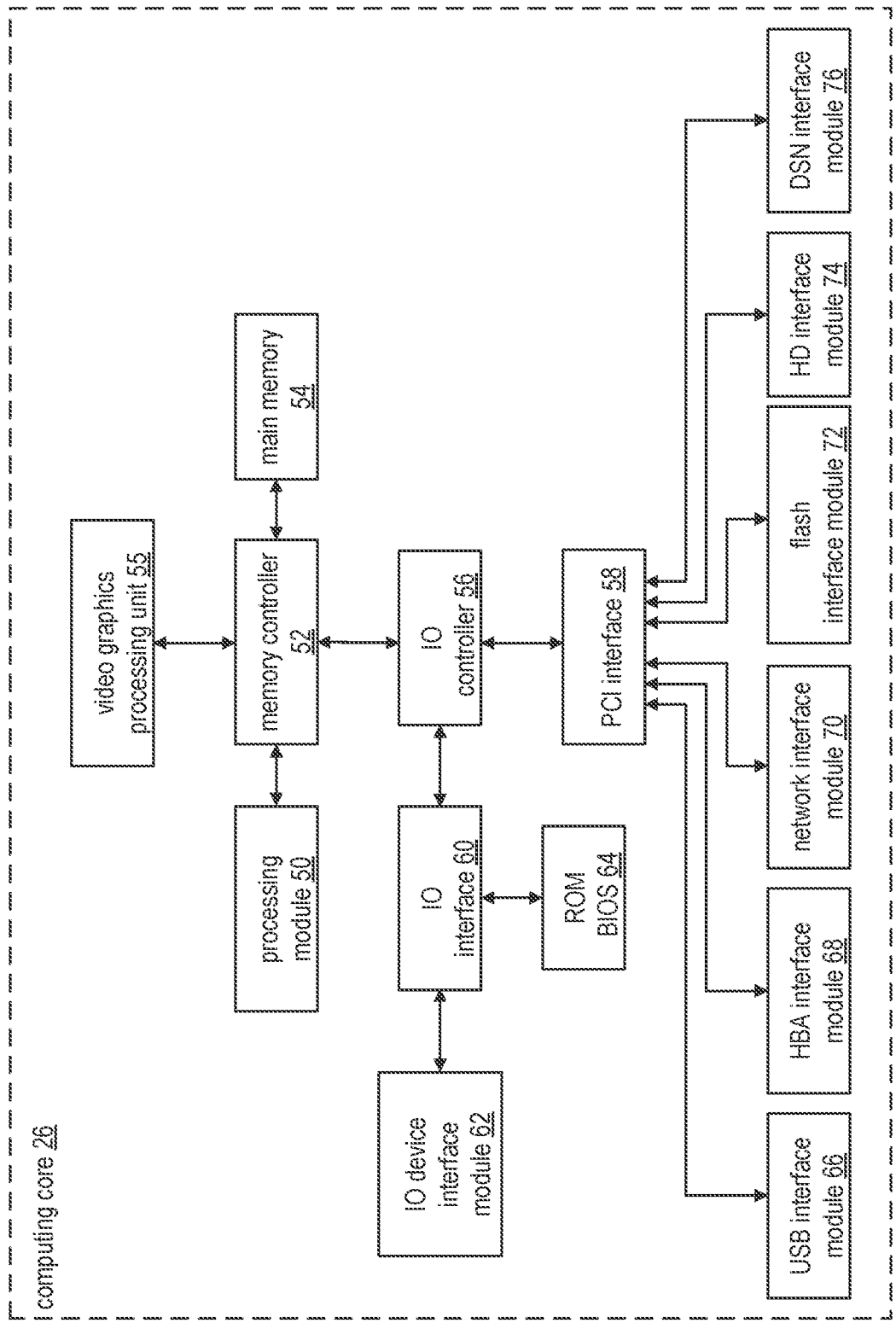
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-9A. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate per-access billing information. In another instance, the DSN managing unit 18 tracks the amount of data stored and/or retrieved by a user device and/or a user group, which can be used to generate per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figures 3, 4, 5, 6:
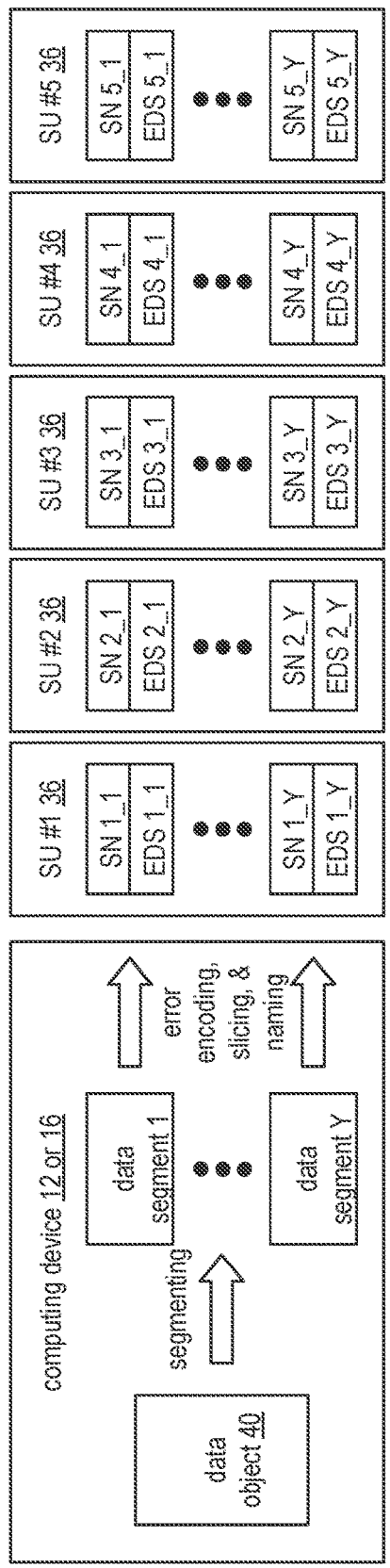
FIG. 3 is a schematic block diagram of an example of dispersed storage error encoding of data in accordance with the present invention.
FIG. 4 is a schematic block diagram of a generic example of an error encoding function in accordance with the present invention.
FIG. 5 is a schematic block diagram of a specific example of an error encoding function in accordance with the present invention.
FIG. 6 is a schematic block diagram of an example of a slice name of an encoded data slice (EDS) in accordance with the present invention.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
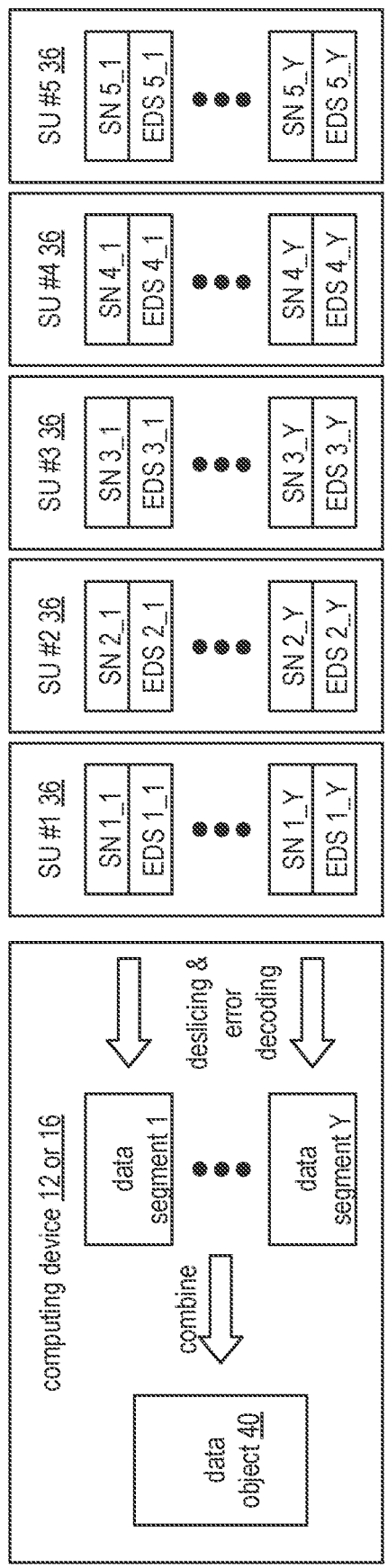
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
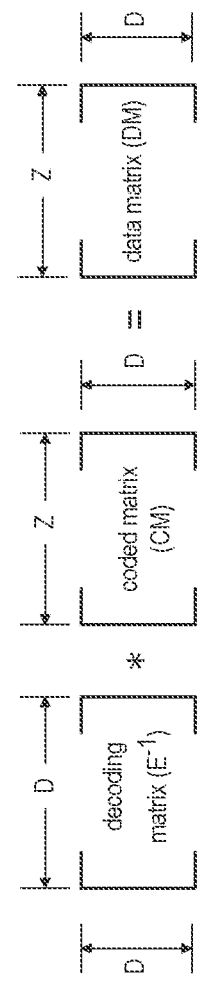
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

In typical DSN memory environments, DSN storage units are spread across multiple geographical locations for availability reasons. Each location (site) can have network connectivity between additional sites for variety of reasons (cost, security, etc.). Therefore, it is possible for a site "cluster" to coordinate messages, statistics, events, management data such that "views" of data sets are aggregated at the site level.

Figure 9:
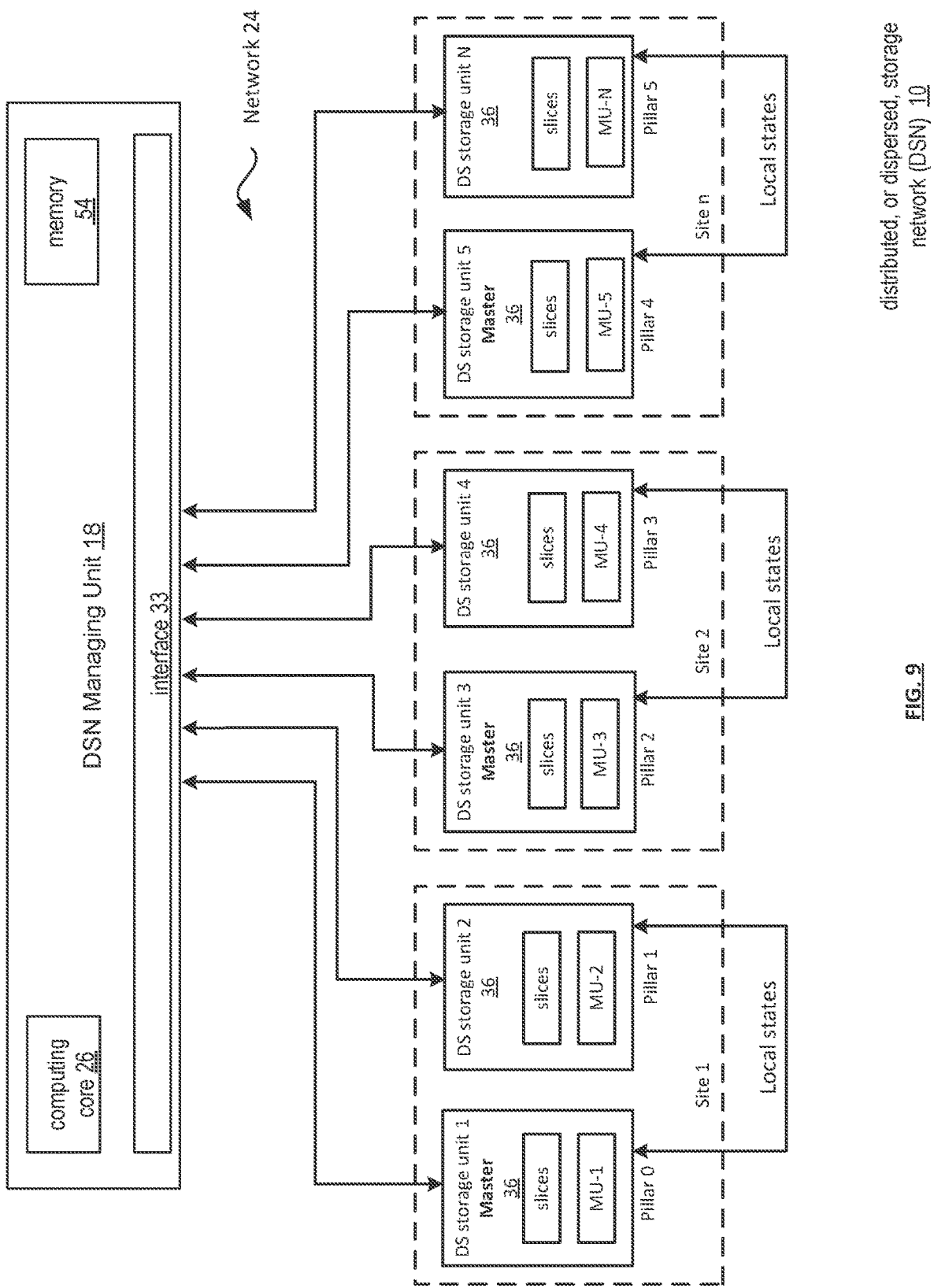
FIG. 9 is a schematic block diagram of an example of site-based coordination of distributed storage network memory in accordance with the present invention.

FIG. 9 is a schematic block diagram of an example of site-based coordination of distributed storage network memory in accordance with the present invention. Dispersed storage network (DSN) 10 includes at least DSN managing unit 18, DSN memory 22 apportioned into sites (1-n) each with a subset of a plurality storage units (1-N). Each storage unit also includes a local managing unit (MU (1-N)) and a plurality of DSN memories storing encoded data slices. DSN managing unit 18 is communicatively connected to sites 1-n through network 24 of FIG. 1. In this example embodiment, six DS storage units (storing pillar 0-pillar 5) are located at three different sites; pillars 0-1 are located at site 1, pillars 2-3 are located at site 2, and pillars 4-5 are located at site n.

DSN managing unit 18 includes the computing core 26 and memory 54 of FIG. 2 and an interface, which can include, for example, interface 30, 32, and/or 33 of FIG. 1. Each local managing unit (MU (1-N)) can also include the interface 33 and computing core 26 of FIG. 1. Each DSN storage site (1-n) can include the same number or a different number of storage units k. Each DSN memory can, for example, be utilized by DSN memory 22 of FIG. 1, and each storage unit can, for example, be utilized by storage unit 36 of FIG. 1.

Typically, DSN managing unit 18 is responsible for memory management, monitoring, and debugging across multiple DSN components and memories. In various embodiments, DSN managing unit 18 performs memory management, monitoring, and debugging by transmitting configuration update requests to local managing units in each DSN storage site, which in turn push appropriate update requests to the DSN storage units they manage. In response, the DSN storage units can transmit requested logs and/or statistics back to their local managing unit to be forwarded back to the DSN management unit for aggregation, analysis, and/or storage.

However, to reduce a DSN management unit workload and increase overall DSN efficiency, in one embodiment, a single local managing unit MU (1-N) can be elected as a local master management unit to collect managing unit data from each storage unit for an entire site. In this configuration, DSN management unit 18 need only communicate with each local master management unit to obtain site information. For example, once the local master management unit of the site has received the site configuration, it can take over the responsibility of generating alerts (such as emails, syslog, and SNMP traps) on an aggregated site data set.

Site data aggregation occurs via the following steps: sites are created in DSN management unit, the sites are configured in DSN management unit such that each site has a subset of DSN storage units, each DSN storage unit receives its current site configuration using a pre-defined storage container holding configuration change request or directly from a DSN management unit, aggregated site views are maintained by a locally elected master management unit (shown as MU-1, MU-3 and MU-5 of DS storage units 1, 3 and 5, respectively) selected by any leader election algorithm (e.g., virtual ring in a complete network). Once elected, the local master management unit collects local state from each node (storage unit through its local management unit) and executes tabulation, optionally distributing tabulated state across all nodes thus reaching consistency within the DSN storage site. Any of the DS storage unit's local management units can be elected as a local master management unit for their respective DSN storage site.

When a new local master management unit is elected, the new local master management unit will either have a consistent view of a previous tabulated state or need to re-tabulate and aggregate data. DSN management unit 18 and local master management units are made aware of the newly elected leader via existing coordination mechanisms. This enables visualization of the current local master management unit as well as the ability to elect a new leader on demand by an operator if so desired.

For example, the local master management unit could alert of pending degradation of storage pool health (assuming enough units are contained within that site to make that determination). The higher-level management DSN unit 18 is aware of the alert but does NOT re-send the alert. Furthermore, generation of said alert is recorded by the local master management unit and persisted to an vault to eliminate duplication as a new local master management unit comes online. For example, aggregated storage statistics are generated based on collected storage unit data received from each of the plurality of local master managing units (MU (1-N)) at each site. In various embodiments, the DSN managing unit 18 can receive configuration parameters, for example, via computing device 12, 14, or 16, or directly via the interface. The configuration parameters can include and/or be based on user input to a computing device or to the local master management unit itself. In various embodiments, the configuration parameters can be generated by the local master management unit itself based on analysis of data gathered while monitoring the DSN storage site. The configuration parameters can specify an update to one or more DSN components of the DSN, such as one or more storage units, one or more computing devices, one or more integrity processing units 20 of FIG. 1, one or more managing units 18 of FIG. 1, or other components present in the DSN. The configuration parameters can further specify component parameters of the one of more components to be enabled or overridden, specify new values the component parameters should be set to, specify which software releases to apply against, and/or specify the set of components to which the update applies.

In various embodiments, data from DSN storage units in the DSN such as logs and/or statistics are desired for the purpose of monitoring and/or debugging in the DSN, for example, to monitor and/or debug the update described above. The configuration parameters can indicate a set of statistics and/or logs to collect, what level of verbosity of logs to capture, what time frames to collect over, and/or other information relating to statistics collection from one or more DSN storage units and/or components in the DSN. In various embodiments, the specified statistics and/logs can be based on data that would be specifically relevant to debugging the configuration update. In other embodiments, the collection of logs and statistics is broadly directed to monitoring the DSN, and the monitoring system can specify a broader set statistics and/or logs relevant to monitoring performance and/or capacity of units in the system.

In various embodiments, DSN managing unit 18 can enable the update and/or data collection indicated by the configuration parameters by transmitting this information to one or more local master management units in the DSN, for example, via network 24. For example, the DSN managing unit 18 can transmit a configuration update request based on the configuration parameters to each local master management unit in the DSN. In response, each local master management unit can push update specifications and/or statistics collection requests to a plurality of nodes in a DSN storage site. In various embodiments, the configuration update request can include configuration specifications that apply to each local master managing unit or local managing unit itself. Each local managing unit can periodically communicate with the local master management unit and/or a particular instance to receive the latest configuration specification. Each local master managing unit can parse the configuration update request received from the DSN management unit and/or instance and apply the applicable configuration to the specified storage units it manages, as well as enable statistics and/or log collection on targeted components and/or units according to the configuration. In various embodiments, the local master managing unit will communicate the configuration update to only a subset of the units it manages, based on targeted units indicated after parsing the configuration update request received from the DSN management unit.

In various embodiments, the plurality of storage units of the DSN, upon receiving update configuration specifications from their corresponding local master managing unit, can override and/or enable their own configuration settings as directed. The DSN storage units can periodically communicate with their corresponding local master managing unit to receive the configuration specifications and requests from logs and/or statistics. Logs and/or statistics can also be transmitted by each unit on a periodic time interval and/or when a certain condition is met.

In various embodiments, the local master managing unit, upon receiving statistics and/or logs from the plurality of components and/or units its responsible for, can transmit this information back to the DSN managing unit 18. In various embodiments, the logs and/or statistics can be sent to a designated storage location indicated in a configuration update request. In other embodiments, each local master managing unit can determine which logs and/or statistics it receives are relevant, for example, based on the configuration update request received. Each local master managing unit can parse, filter, aggregate, and/or compress this data into a report before transmitting it back to the DSN management unit.

In various embodiments, DSN managing unit 18, upon receiving the logs and/or statistics from each managing unit, can further parse, filter, aggregate, and/or compress the data. DSN managing unit 18 can perform analysis, such as searching for defect signatures in the data, organizing and/or categorizing data, and/or determining or projecting when future storage may be needed. In various embodiments, the DSN management unit can use this data to debug the latest update, and can adjust the configuration parameters and/or transmit a new configuration update request to the local master managing units accordingly. In various embodiments, the logs and/or statistics can be logged for in an archive. In various embodiments, analysis can be performed on old logs and/or statistics retrieved from such an archive along with the current logs and or statistics. For example, the current logs and/or statistics can be compared to corresponding past logs and/or statistics to generate projections or find anomalies that could indicate a bug in the latest update.

In various embodiments, the configuration parameters indicate at least one configuration setting of at least one dispersed storage component for update by the at least one dispersed storage component, where the at least one dispersed storage component includes a storage unit, a computing device, a DSN managing unit, and/or a DSN integrity unit. In various embodiments, the configuration parameters include statistics collection parameters, and the collected storage unit data received from each of the plurality of managing units corresponds to the statistics collection parameters. In various embodiments, the statistics collection parameters indicate a plurality of statistics to collect, a time frame for statistics collection, and/or a verbosity of logs to collect. In various embodiments, the collected storage unit data received from each of the plurality of local master managing units includes data collected from at least one storage unit managed by the each of the plurality of managing units, where the data collected includes at least one of statistics or logs corresponding to the at least one storage unit. In various embodiments, the at least one storage unit is a proper subset of a plurality of storage units managed by the each of the plurality of local master managing units, and wherein the proper subset is based on the configuration update request. In various embodiments, the collected storage unit data is received from each of the plurality of local master managing units as an aggregated report, wherein data provided in the aggregated report is based on the configuration update request.

In various embodiments, new configuration parameters are generated based on the aggregated storage statistics. A new configuration update request is generated for transmission to each of the local master managing units based on the new configuration parameters. In various embodiments, the collected storage unit data is stored in a memory coupled to the DSN management unit 18, and generating the aggregated storage statistics is further based on a plurality of past collected storage unit data stored in the memory. In various embodiments, projected storage data indicating when future storage will be needed is generated based on the collected storage unit data.

Figure 9A:
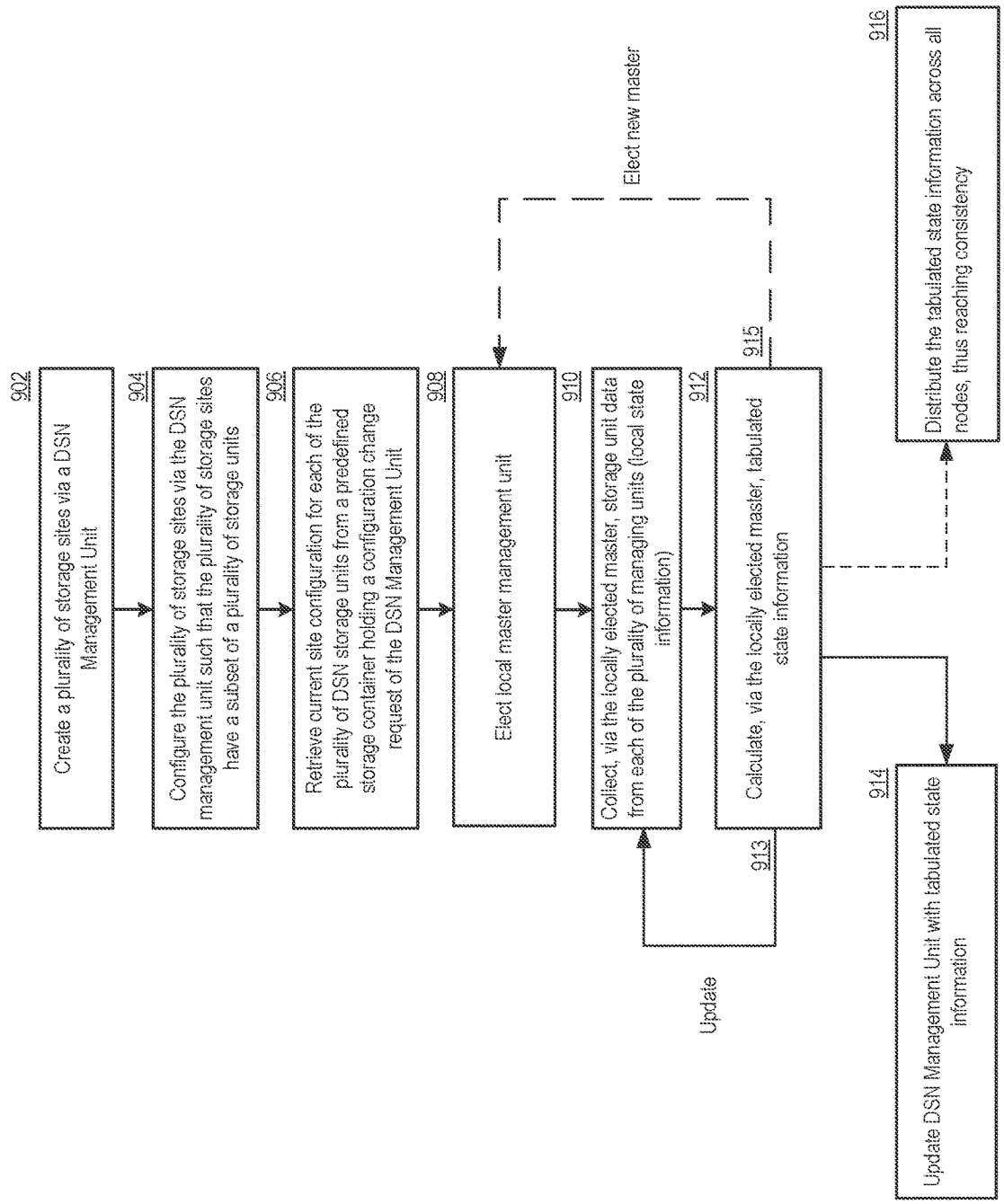
FIG. 9A is a diagram illustrating site-based coordination of distributed storage network memory in accordance with the present invention.

FIG. 9A is a diagram illustrating site-based coordination of distributed storage network memory in accordance with the present invention. In particular, a method is presented for use in conjunction with one or more functions and features described in conjunction with FIGS. 1-2, 3-8, and also FIG. 9.

In step 902, storage sites are created in DSN management unit 18 (by user, administrator or automatically based on existing/new storage facilities, existing/new storage units, storage needs, performance requirements and/or storage statistics). In step 904, the storage sites are configured by DSN management unit 18 such that each storage site has a subset of DSN storage units. In step 906, each DSN storage unit receives its current site configuration using a predefined storage container holding configuration change request or directly from DSN management unit 18.

In step 908, a local master management unit is elected to maintain aggregated views of its respective storage site. The local master may be elected by any known/future leader election algorithm (e.g., virtual ring in a complete network).

In step 910, once elected, the local master management unit collects local states (to include any of configuration information, storage statistics, errors, alerts, etc.) from each node (storage unit).

In step 912, the local master management unit executes tabulation (aggregation) of collected states to obtain a view of the entire site. In step 913, updated states are collected from the local managing units within the site.

In step 914, local master management unit distributes the tabulated state to the DSN master management unit 18. In step 916, it can optionally distribute the tabulated state across all nodes within the site thus reaching consistency.

In step 915, when a new leader (local master management unit) is elected, the new leader will either have a consistent view of a previous tabulated state or need to re-tabulate and aggregate data. Also, in step 915, local management units are made aware of the newly elected leader via existing coordination mechanisms. This enables visualization of the current local master MU as well as the ability to elect a new leader on demand (e.g., by an operator) if so desired.

The method described above in conjunction with the processing module can alternatively be performed by other modules of the dispersed storage network or by other computing devices. In addition, at least one memory section (e.g., a non-transitory computer readable storage medium) that stores operational instructions can, when executed by one or more processing modules of one or more computing devices of the dispersed storage network (DSN), cause the one or more computing devices to perform any or all of the method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by one or more processing modules of one or more computing devices of a dispersed storage network (DSN), the method comprises:
    creating a plurality of DSN storage sites via a DSN management unit;
    configuring the plurality of DSN storage sites, via the DSN management unit, to each include a subset of a plurality of DSN storage units;
    retrieving a current site configuration for the subset of a plurality of DSN storage units;
    electing a local master management unit for each of the DSN storage sites, wherein the local master management unit maintains aggregated views of each the DSN storage sites;
    collecting, via the local master management units, local state information from each of the subset of a plurality of DSN storage units per a respective DSN storage site;
    calculating, via the local master management unit, tabulated state information for the respective DSN storage site; and
    updating the DSN management unit with the tabulated state information,
    wherein the electing a local master management unit includes implementing a leader election algorithm.

2. The method of claim 1, wherein the electing a local master management unit for each of the DSN storage sites includes selecting one local management unit from a plurality of local management units per DSN storage site.

3. The method of claim 2, wherein each of the plurality of DSN storage units includes one local management unit of the plurality of local management units.

4. The method of claim 1 further comprises, via the local master management unit, distributing the tabulated state information across all nodes of the respective DSN storage site.

5. The method of claim 1, wherein the retrieving a current site configuration includes retrieval from a predefined storage container holding a configuration change request.

6. The method of claim 1, wherein the retrieving a current site configuration includes retrieval from the DSN management unit.

7. The method of claim 1, wherein the DSN management unit communicates with only one local master management unit per DSN storage site.

8. The method of claim 1, wherein the electing a local master management unit further includes updating to a new local master management unit from a previously elected local master management unit.

9. The method of claim 1, wherein each of the plurality of DSN storage units stores encoded data slices received from a computing device that creates the encoded data slices using dispersed storage error encoding.

10. The method of claim 9, wherein the computing device that creates the encoded data slices is part of the DSN and is separate from the DSN managing unit and the plurality of DSN storage units.

11. A computing device of a group of computing devices of a dispersed storage network (DSN), the computing device comprises:
    an interface;
    a local memory; and
    a processing module operably coupled to the interface and the local memory, wherein the processing module functions to:
        create a plurality of DSN storage sites via a DSN management unit;
        configure each of the plurality of DSN storage sites, via the DSN management unit, to include a subset of a plurality of DSN storage units;
        retrieve a current site configuration for the subset of a plurality of DSN storage units;
        elect a local master management unit for each of the DSN storage sites, wherein the local master management unit maintains aggregated views of each of the DSN storage sites;
        collect, via the local master management units, local state information from each of the subset of a plurality of DSN storage units per a respective DSN storage site;
        calculate, via the local master management unit and using the collected local state information, tabulated state information for the respective DSN storage site;
        update the DSN management unit with the tabulated state information; and
        distribute, via the local master management unit, the tabulated state information across all nodes within the respective DSN storage site.

12. The computing device of claim 11, wherein the electing a local master management unit for each of the DSN storage sites includes selecting one local management unit from a plurality of local management units.

13. The computing device of claim 12, wherein each of the plurality of DSN storage units includes one local management unit of the plurality of local management units.

14. The computing device of claim 11, wherein the retrieving a current site configuration includes retrieval from a predefined storage container holding a configuration change request.

15. The computing device of claim 11, wherein the retrieving a current site configuration includes retrieval from the DSN management unit.

16. The computing device of claim 11, wherein the DSN management unit communicates with only one local master management unit per DSN storage site.

17. The computing device of claim 11 wherein the electing a local master management unit further includes updating to a new local master management unit from a previously elected local master management unit.

18. A dispersed storage network (DSN) including a plurality of DSN storage sites comprises:
- a DSN managing unit to manage the plurality of DSN storage sites, wherein the DSN stores data using dispersed storage error encoding;
- a local master managing unit for each of the plurality of DSN storage sites, wherein the local master managing unit is elected from a plurality of local managing units associated with a plurality of DSN storage units representing a subset of storage units of the DSN, wherein the local master managing unit includes:
  - an interface;
  - a local memory; and
  - a processing module operably coupled to the interface and the local memory, wherein the processing module functions to:
    - collect local state information from each storage unit of the subset of storage units of the DSN; and
    - calculate, using the collected local state information, tabulated state information of each of the DSN storage sites; and
    - return, via network communications, the tabulated state information to the DSN managing unit.

19. The distributed storage network (DSN) of claim 18, wherein the DSN management unit communicates with only one local master management unit per DSN storage site.

20. The distributed storage network (DSN) of claim 18, wherein the electing a local master management unit further includes updating to a new local master management unit from a previously elected local master management unit.

* * * * *